UNITED STATES PATENT OFFICE.

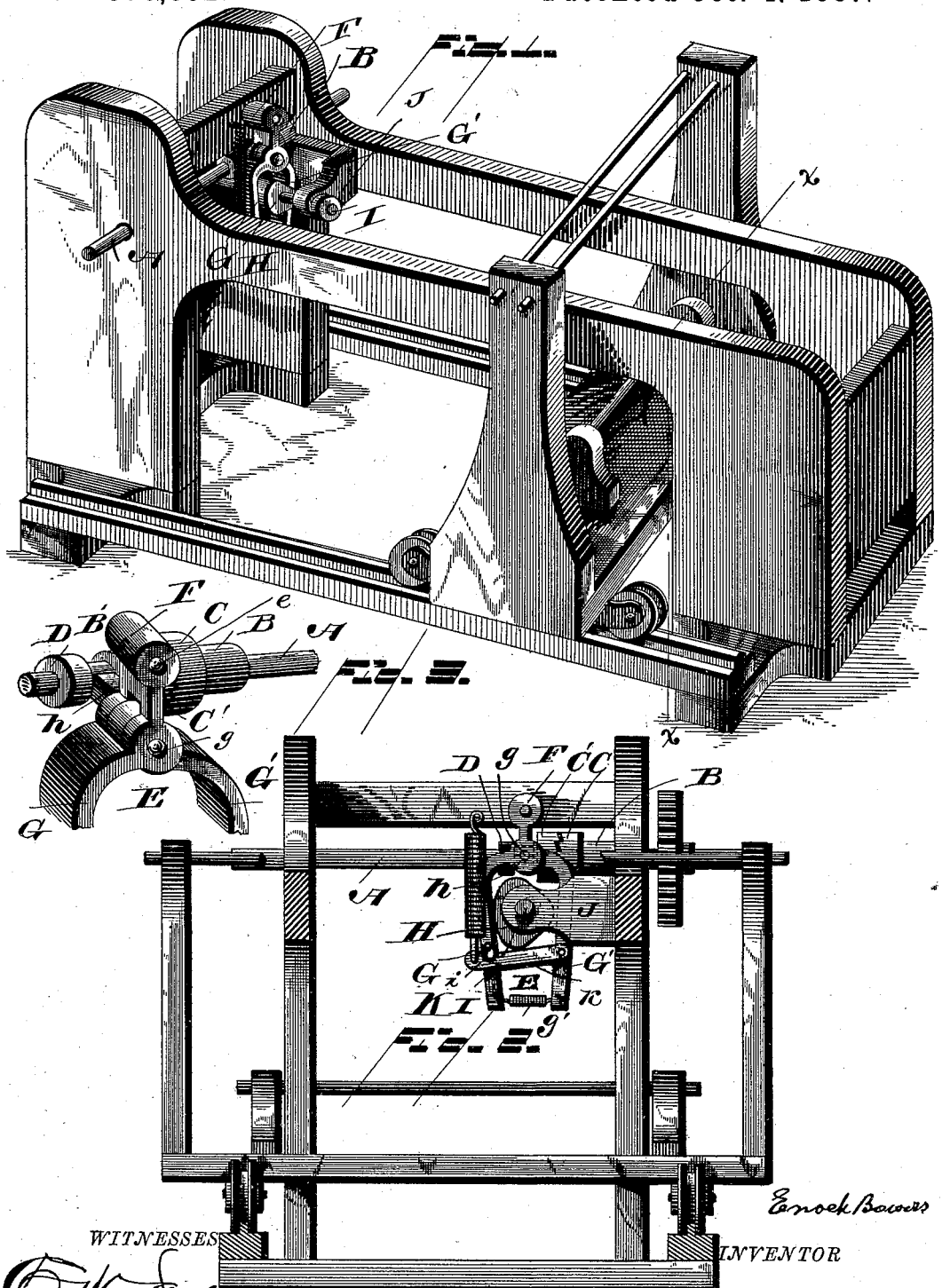

ENOCH BOWERS, OF TRENTON, NEW JERSEY.

CLUTCH.

SPECIFICATION forming part of Letters Patent No. 370,852, dated October 4, 1887.

Application filed July 8, 1887. Serial No. 243,742. (No model.)

*To all whom it may concern:*

Be it known that I, ENOCH BOWERS, a citizen of the United States, residing at Trenton, in the county of Mercer and State of New Jersey, have invented certain new and useful Improvements in Clutches; and I do declare the following to be a full, clear, and exact description of the invention, such as will enable others skilled in the art to which it appertains to make and use the same.

My invention relates to a new and valuable improvement in clutches which are especially applicable to spinning machinery, but which are useful for other kinds of machinery, which improvement will be fully understood from the following description, taken in connection with the annexed drawings.

In the accompanying drawings, Figure 1 is a perspective view of part of a spinning-machine, showing the clutch in position thereon. Fig. 2 is a transverse sectional view taken through the machine on the line $x\,x$ of Fig. 1, showing the clutch in elevation; and Fig. 3 is an enlarged detailed perspective view, showing a portion of the yoke carrying the operating nib or arm.

Referring by letter to the said drawings, A designates a shaft driven by any suitable means and carrying a sleeve, B. This sleeve is secured rigidly on the shaft in any suitable manner, and is adapted to turn with said shaft. This sleeve is provided with a boss, C, the toothed face of which is adapted to engage with the toothed face of a similar boss, C', formed on the end of a sleeve, B', which is loose on shaft A. This sleeve has at its other end a small boss, D, thus leaving an annular groove or recess between the two bosses C' D, respectively, for a purpose presently explained.

E is the yoke, that is attached to the machine by an arm, F, through the medium of a pin or bolt, e. This yoke is composed of the two movable arms G G', pivoted together at their upper ends, as at g, and connected at their lower ends by a coiled spring, g'. One end of the pivot-pin g is extended to form the operating nib or projection h, that is adapted to work in the annular groove formed by the bosses C' D, respectively, formed upon sleeve B'. The arms G G' of the yoke are actuated through the medium of a "heart-shaped" cam, H, formed on an operating-shaft, I. This shaft is journaled at each end in a bracket, J, the latter being secured to the machine in any suitable manner. The heart-shaped cam carried by the shaft I is adapted to turn with the same and work between the arms G G' of the yoke E.

K designates a latch that is pivoted at one end to the arm G' of the yoke, and at its other end it is adapted to engage with a stud, $i$, formed on the other arm, G, whereby the said arms may be held in a locked position. To the free end of the catch I attach a coiled spring at one end, and at the other end it is secured to the machine at the desired point of attachment, whereby the said catch is given a spring action and held securely in engagement with the stud or pin formed on the arm G of the yoke E.

It will be understood from the foregoing description, together with the drawings, that when the heart-shaped cam is revolved through the medium of the shaft the arms G G' of the yoke are caused to move laterally, whereby the operating-stud $h$, carried by the said yoke, works in the groove of the sleeve B', formed by the disks C' D, respectively, thus causing the latter to be thrown into and out of engagement with the disk C of the sleeve B.

In consequence of there being undue strain upon the disks of the clutch, whereby the teeth are liable to slip or become disengaged, I employ a catch, K, hereinbefore described, which securely holds the arms G G' of the yoke and insures the maintenance of the clutch properly in gear at all times.

In operation it will be observed that at each revolution of the cam H the clutch-sleeve B' will be disengaged from the clutch-sleeve B, during which disengagement the cam will release the latch from its pin $i$ on yoke-arm G, after which the clutch-sleeve B' will be engaged with the clutch-sleeve B, and the latch K will be lifted by its spring and engaged with its pin $i$, thereby holding the two sleeves positively locked.

Having thus fully described my invention, what I claim as new is—

1. The combination, with a suitable frame, of the shaft A, provided with clutch-sleeves B B′, a yoke composed of arms F G G′, pivoted to the said frame, and provided with pin $i$, a spring-actuated latch, a cam, H, on shaft I, and a tension-spring, $g'$, all constructed as described.

2. The combination, with the vibrating yoke, as described, of the spring-actuated latch K, pivoted to one of the arms of said yoke and adapted to engage with a pin on the other yoke-arm, the tension-spring between said arms, the clutch-sleeves on shaft A, and a cam adapted to act on both of said arms and also to disengage the said latch from its pin $i$, substantially as described.

In testimony whereof I affix my signature in presence of two witnesses.

ENOCH BOWERS.

Witnesses:
R. S. WOODRUFF,
E. F. WOODRUFF.